:::: {.columns}
::: {.column}
(12) United States Patent
Yatsu

(54) HEADLIGHT DEVICE AND VEHICLE DEVICE USING SAME

(71) Applicant: MAXELL, LTD., Kyoto (JP)

(72) Inventor: Masahiko Yatsu, Ibaraki (JP)

(73) Assignee: Maxell, Ltd., Kyoto (JP)

( * ) Notice: Subject to any disclaimer, the term of this patent is extended or adjusted under 35 U.S.C. 154(b) by 104 days.

(21) Appl. No.: 15/315,668

(22) PCT Filed: Jun. 18, 2014

(86) PCT No.: PCT/JP2014/066187
§ 371 (c)(1),
(2) Date: Dec. 1, 2016

(87) PCT Pub. No.: WO2015/193996
PCT Pub. Date: Dec. 23, 2015

(65) Prior Publication Data
US 2017/0144591 A1     May 25, 2017

(51) Int. Cl.
*H04N 5/74* (2006.01)
*B60Q 1/34* (2006.01)
(Continued)

(52) U.S. Cl.
CPC ............ *B60Q 1/34* (2013.01); *B60Q 1/04* (2013.01); *B60Q 1/18* (2013.01); *F21S 41/125* (2018.01); *F21S 41/147* (2018.01); *F21S 41/25* (2018.01); *F21S 41/321* (2018.01); *F21S 41/645* (2018.01); *G03B 21/208* (2013.01); *G03B 21/2066* (2013.01); *G09G 3/001* (2013.01);
(Continued)
:::
::: {.column}

(10) Patent No.: US 10,214,141 B2
(45) Date of Patent: Feb. 26, 2019

(58) Field of Classification Search
None
See application file for complete search history.

(56) References Cited

U.S. PATENT DOCUMENTS

| | | | |
|---|---|---|---|
| 2002/0196636 | A1* | 12/2002 | Dassanayake ......... B60Q 1/085 362/465 |
| 2004/0218401 | A1 | 11/2004 | Okubo et al. |

(Continued)

FOREIGN PATENT DOCUMENTS

| | | |
|---|---|---|
| DE | 102009020910 A1 | 11/2010 |
| JP | 2004-136838 A | 5/2004 |

(Continued)

OTHER PUBLICATIONS

The Japanese Office Action dated Dec. 26, 2017 for the Japanese Application No. 2016-528715.
Chinese Office Action dated May 3, 2018 for the Chinese Patent Application No. 201480079493.0.

*Primary Examiner* — Thai Q Tran
*Assistant Examiner* — Christopher Braniff
(74) *Attorney, Agent, or Firm* — Volpe and Koenig, P.C.

(57) ABSTRACT

A headlight device (1) having a projection function includes a light source device (2), a lighting optical system (3), an image display element (4), an image signal controller (6), and a projection optical system (5). The projection optical system (5) includes a coaxial lens system (11) having a refractive action, a free-form surface lens (12), and a free-form surface mirror (13) from the image display element (4) side. In this way, an image that can be readily visually recognized by a driver or a pedestrian may be projected onto a road.

6 Claims, 10 Drawing Sheets
:::
::::

(51) Int. Cl.
*F21S 41/147* (2018.01)
*F21S 41/25* (2018.01)
*H04N 9/31* (2006.01)
*F21S 41/125* (2018.01)
*F21S 41/32* (2018.01)
*F21S 41/64* (2018.01)
*B60Q 1/04* (2006.01)
*G03B 21/20* (2006.01)
*G09G 3/00* (2006.01)
*B60Q 1/18* (2006.01)
*G02B 3/02* (2006.01)
*G02B 5/10* (2006.01)

(52) U.S. Cl.
CPC ............ *H04N 5/74* (2013.01); *H04N 9/3185* (2013.01); *H04N 9/3188* (2013.01); *H04N 9/3194* (2013.01); *B60Q 2400/50* (2013.01); *G02B 3/02* (2013.01); *G02B 5/10* (2013.01); *G09G 2340/045* (2013.01); *G09G 2380/10* (2013.01)

(56) References Cited

U.S. PATENT DOCUMENTS

| | | |
|---|---|---|
| 2007/0279598 A1 | 12/2007 | Hisada et al. |
| 2008/0198372 A1* | 8/2008 | Pan .......................... B60Q 1/38 356/121 |
| 2011/0299049 A1* | 12/2011 | Yatsu ..................... G02B 13/18 353/98 |
| 2015/0167913 A1 | 6/2015 | Stefanov et al. |

FOREIGN PATENT DOCUMENTS

| | | |
|---|---|---|
| JP | 2005-306337 A | 11/2005 |
| JP | 2007-322811 A | 12/2007 |
| JP | 2008-143505 A | 6/2008 |
| JP | 2008-201407 A | 9/2008 |
| JP | 2009-184428 A | 8/2009 |
| JP | 2011-253024 A | 12/2011 |
| JP | 2012-247369 A | 12/2012 |
| WO | 2014/019912 A1 | 2/2014 |

\* cited by examiner

F I G. 4

LENS DATA OF PROJECTION OPTICAL SYSTEM

| NAME | SURFACE NUMBER | SHAPE | RADIUS OF CURVATURE | INTER-SURFACE DISTANCE | GLASS MATERIAL NAME | ECCENTRICITY/SLANT CONTENT | ECCENTRICITY | SLANT |
|---|---|---|---|---|---|---|---|---|
| | SURFACE 0 | PLANE | ∞ | 0.303 | | | | |
| COVER GLASS | SURFACE 1 | PLANE | ∞ | 0.65 | 'EAGLE_XG' | | | |
| | SURFACE 2 | PLANE | ∞ | 3 | | | | |
| TIR | SURFACE 3 | PLANE | ∞ | 14 | BSC7_HOYA | | | |
| | SURFACE 4 | PLANE | ∞ | 1.400 | | | | |
| L1 | SURFACE 5 | SPHERE | 18.876 | 5.900 | LAC14_HOYA | NORMAL ECCENTRICITY | 1.744 | -6.861 |
| | SURFACE 6 | SPHERE | -331.3 | 2.584 | | | | |
| L2 | SURFACE 7 | ASPHERIC SURFACE | 25.1016 | 2.5 | 'PMMA30' | | | |
| | SURFACE 8 | ASPHERIC SURFACE | 24.3055 | 0.641 | | | | |
| L3 | SURFACE 9 | SPHERE | 27.83 | 4.200 | FC5_HOYA | | | |
| | SURFACE 10 | SPHERE | -36.3 | 8.242 | | | | |
| APERTURE DIAPHRAGM | SURFACE 11 | PLANE | ∞ | 0.6 | | | | |
| L4 | SURFACE 12 | SPHERE | -80.7 | 3 | LAC14_HOYA | | | |
| | SURFACE 13 | SPHERE | -19.465 | 1.903 | | | | |
| L5 | SURFACE 14 | SPHERE | -15.36 | 1.2 | FC5_HOYA | | | |
| | SURFACE 15 | SPHERE | 48.432 | 3.675 | | | | |
| L6 | SURFACE 16 | SPHERE | -56.3700 | 4.1 | FDS90_HOYA | | | |
| | SURFACE 17 | SPHERE | -25.4790 | 1.388 | | | | |
| L7 | SURFACE 18 | ODD-ORDER ASPHERIC SURFACE | -56.0039 | 3.7 | 'PMMA25' | | | |
| | SURFACE 19 | ODD-ORDER ASPHERIC SURFACE | -39.3702 | 8.043 | | | | |
| L8 | SURFACE 20 | XY POLYNOMIAL SURFACE | ∞ | 6.7 | 'PMMA25' | DECENTER & RETURN | 6.447 | 0 |
| | SURFACE 21 | XY POLYNOMIAL SURFACE | ∞ | 51.445 | | DECENTER & RETURN | 0.402 | 0 |
| M9 | SURFACE 22 | XY POLYNOMIAL SURFACE | ∞ | 0 | REFLECTION | DECENTER & RETURN | 18.043 | -34.327 |
| | SURFACE 23 | PLANE | ∞ | -2995.208 | | NORMAL ECCENTRICITY | 0.000 | -75.927 |
| IMAGE SURFACE | SURFACE 24 | PLANE | ∞ | 0 | | DECENTER & RETURN | 0 | 76.488 |

F I G. 5

FREE-FORM SURFACE COEFFICIENT OF
LENS L8 AND MIRROR M9 (EQUATION 1)

| CODE | | SURFACE L8A | SURFACE L8B | M9 |
|---|---|---|---|---|
| 1/R | c | 0 | 0 | 0 |
| K | K | 0 | 0 | 0 |
| C3 | $Y^1$ | −5.51998E−01 | −6.05444E−01 | 0 |
| C4 | $X^2$ | −4.93381E−02 | −4.29247E−02 | 5.17285E−03 |
| C6 | $Y^2$ | −3.69201E−02 | −2.66694E−03 | −1.09607E−03 |
| C8 | $X^2Y$ | −1.56850E−03 | 1.97515E−04 | −1.57122E−04 |
| C10 | $Y^3$ | −3.32042E−03 | 8.70996E−04 | −3.91753E−06 |
| C11 | $X^4$ | −1.53743E−04 | 7.87521E−06 | 1.37103E−07 |
| C13 | $X^2Y^2$ | −2.61950E−04 | 9.50932E−05 | 4.08290E−06 |
| C15 | $Y^4$ | −5.62944E−05 | −5.30512E−05 | 3.85469E−07 |
| C17 | $X^4Y$ | −2.72906E−05 | −6.42759E−06 | 3.23722E−08 |
| C19 | $X^2Y^3$ | 5.67449E−07 | −2.95608E−06 | −9.28347E−08 |
| C21 | $Y^5$ | −1.66808E−06 | −2.62577E−06 | −1.74558E−08 |
| C22 | $X^5$ | 6.86172E−07 | −3.44246E−07 | 3.34700E−11 |
| C24 | $X^4Y^2$ | 3.35116E−06 | −2.55841E−06 | −2.05221E−09 |
| C26 | $X^2Y^4$ | 2.79548E−06 | −1.50079E−06 | 1.31358E−09 |
| C28 | $Y^5$ | −2.42329E−06 | −1.63035E−08 | 4.46548E−10 |
| C30 | $X^6Y$ | 4.02012E−07 | 1.49893E−07 | −7.81925E−12 |
| C32 | $X^4Y^3$ | 4.71303E−07 | 1.54534E−07 | 6.44321E−11 |
| C34 | $X^2Y^5$ | 3.66726E−07 | 7.11488E−08 | 1.72594E−12 |
| C36 | $Y^7$ | 8.94469E−08 | 4.90683E−09 | −2.32211E−12 |
| C37 | $X^8$ | −1.78761E−08 | −8.37318E−09 | −1.13951E−12 |
| C39 | $X^5Y^2$ | −1.83941E−08 | 1.37441E−08 | 3.07626E−13 |
| C41 | $X^4Y^4$ | 1.15052E−08 | 1.11039E−08 | −1.15097E−12 |
| C43 | $X^2Y^5$ | 5.12537E−08 | 2.18175E−09 | −4.32590E−13 |
| C45 | $Y^8$ | 4.06120E−08 | 2.66553E−10 | −1.44483E−13 |
| C47 | $X^8Y$ | 5.46907E−10 | −2.10429E−09 | 3.82842E−14 |
| C49 | $X^6Y^3$ | −8.70735E−10 | −8.75217E−10 | −5.15782E−15 |
| C51 | $X^4Y^5$ | 1.15997E−09 | −3.73635E−10 | 1.05120E−14 |
| C53 | $X^2Y^7$ | 2.24090E−09 | 1.77239E−10 | 6.69766E−15 |
| C55 | $Y^8$ | 1.83037E−09 | −2.36030E−13 | 3.05816E−15 |
| C56 | $X^{10}$ | 2.56475E−11 | 5.67417E−11 | 2.66779E−16 |
| C58 | $X^8Y^2$ | 5.94883E−10 | 1.52702E−10 | −4.67882E−16 |
| C60 | $X^6Y^4$ | 5.76416E−12 | −2.71303E−11 | 5.64093E−17 |
| C62 | $X^4Y^6$ | 1.03457E−10 | −1.64283E−11 | −3.76423E−17 |
| C64 | $X^2Y^6$ | −5.83727E−11 | −1.45788E−11 | −3.45414E−17 |
| C66 | $Y^{10}$ | 2.90899E−12 | −4.88940E−13 | −1.83517E−17 |

F I G. 6 A

ASPHERIC SURFACE COEFFICIENT
OF LENS L2 (EQUATION 2)

|     | SURFACE L2A   | SURFACE L2B   |
| --- | ------------- | ------------- |
| 1/c | 25.1016       | 24.3055       |
| K   | 0             | 0             |
| A   | −1.73712E−04  | −7.63379E−05  |
| B   | −5.71299E−07  | −1.65803E−07  |
| C   | 6.68920E−09   | 7.49202E−09   |
| D   | 7.36237E−12   | −3.13897E−11  |
| E   | −1.62783E−14  | −5.06385E−13  |
| F   | −1.54053E−15  | 3.65682E−15   |
| G   | −1.56292E−17  | 1.35352E−16   |
| H   | 8.31140E−20   | 1.03786E−18   |
| J   | 4.06827E−21   | −1.56648E−20  |

F I G. 6 B

ODD-ORDER ASPHERIC SURFACE COEFFICIENT
OF LENS L7 (EQUATION 2)

|      | SURFACE L7A  | SURFACE L7B  |
| ---- | ------------ | ------------ |
| 1/c  | −56.0039     | −39.3702     |
| K    | 0            | 0            |
| $AR_3$  | −1.06442E−04 | 6.17053E−04  |
| $AR_4$  | −3.28726E−05 | −1.16392E−04 |
| $AR_6$  | 4.16412E−08  | 2.99702E−07  |
| $AR_8$  | −1.19008E−10 | −2.27925E−10 |
| $AR_{10}$ | 1.41066E−12  | −7.32571E−13 |
| $AR_{12}$ | −1.62233E−14 | 1.17097E−14  |
| $AR_{14}$ | −6.75724E−17 | −5.16403E−17 |
| $AR_{16}$ | −2.46123E−18 | −1.04023E−18 |
| $AR_{18}$ | −3.98043E−20 | −5.04066E−21 |
| $AR_{20}$ | 3.43704E−22  | 5.55823E−23  |

F I G. 7
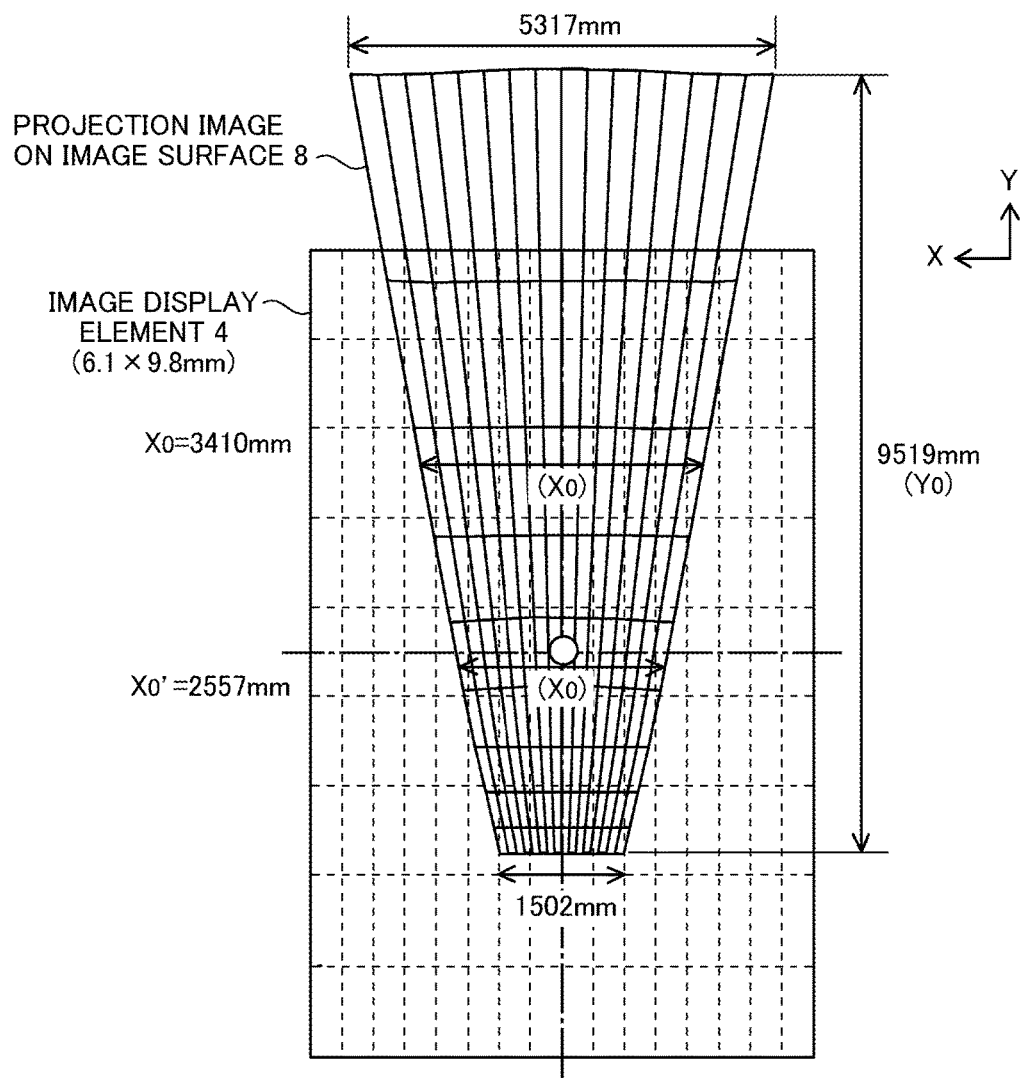

HEADLIGHT DEVICE AND VEHICLE DEVICE USING SAME

TECHNICAL FIELD

The present invention relates to a headlight device having an image projection function, and a vehicle device using the same.

BACKGROUND ART

A vehicle projection device using a headlight as a light source has been known in a conventional art. For example, a projection device described in Patent Document 1 includes a headlight, a projector, and a light outlet. At the time of a projector function, the projector is disposed in an optical path from the headlight to the light outlet to project a formed optical image onto an outer part. In addition, at the time of a headlight function, the projector is disposed at a position, at which the optical path from the headlight to the light outlet is not blocked, to illuminate a predetermined range on the path. Further, Patent Document 1 discloses an example in which an image is displayed on a road as the projector function.

CITATION LIST

Patent Document

Patent Document 1: JP 2004-136838 A

SUMMARY OF THE INVENTION

Problems to be Solved by the Invention

A headlight device having a projection function has a problem below when a projection image is displayed on a road surface.

In a general projection device, a projection image is formed on a front surface, and thus there is no problem in viewing an image projected on a wall surface, etc. while a vehicle stops. However, when a projection image is displayed on the road surface, the image on the road seems small. Thus, in this state, the image is difficult to be visually recognized by a driver or a pedestrian. Even though Patent Document 1 discloses the example in which the image is displayed on the road, displaying an image readily seen by the driver, etc. is not considered.

In addition, in a vehicle equipped with the headlight device having the projection function, visibility for the driver or the pedestrian changes according to a running state, and thus an image needs to be displayed according to the change, which has not been considered in a conventional art.

The invention has been conceived in view of the above-mentioned problem, and an object of the invention is to provide a headlight device that projects an image readily visually recognized by a driver or a pedestrian onto a road, and a vehicle device using the same.

Solutions to Problems

The invention is a headlight device that projects an image onto a road surface, including a light source device, a lighting optical system that condenses light emitted from the light source device, an image display element that forms an optical image by receiving the light condensed by the lighting optical system, an image signal controller that supplies an image signal for forming the optical image to the image display element, and a projection optical system that enlarges the optical image formed by the image display element and projects the enlarged optical image onto the road surface, wherein the projection optical system includes a coaxial lens system having a refractive action, a free-form surface lens, and a free-form surface mirror from a side of the image display element.

Effects of the Invention

The invention may project an image readily visually recognized by a driver or a pedestrian onto a road, and is effective in contributing to preventing a traffic accident.

BRIEF DESCRIPTION OF THE DRAWINGS

FIG. 4 is a diagram illustrating an example of lens data of the projection optical system.

FIG. 5 is a diagram illustrating curved surface shape data of a free-form surface lens $L_3$ and a free-form surface mirror $M_9$.

FIGS. 6A and 6B are diagrams illustrating curved surface shape data of an aspherical lens $L_2$ and an aspherical lens $L_7$.

FIG. 7 is a diagram illustrating distortion of a projection image.

MODE FOR CARRYING OUT THE INVENTION

Hereinafter, embodiments of the invention will be described using drawings.

Embodiment 1

In Embodiment 1, a description will be given of a headlight device having a projection function.

Figure 1:
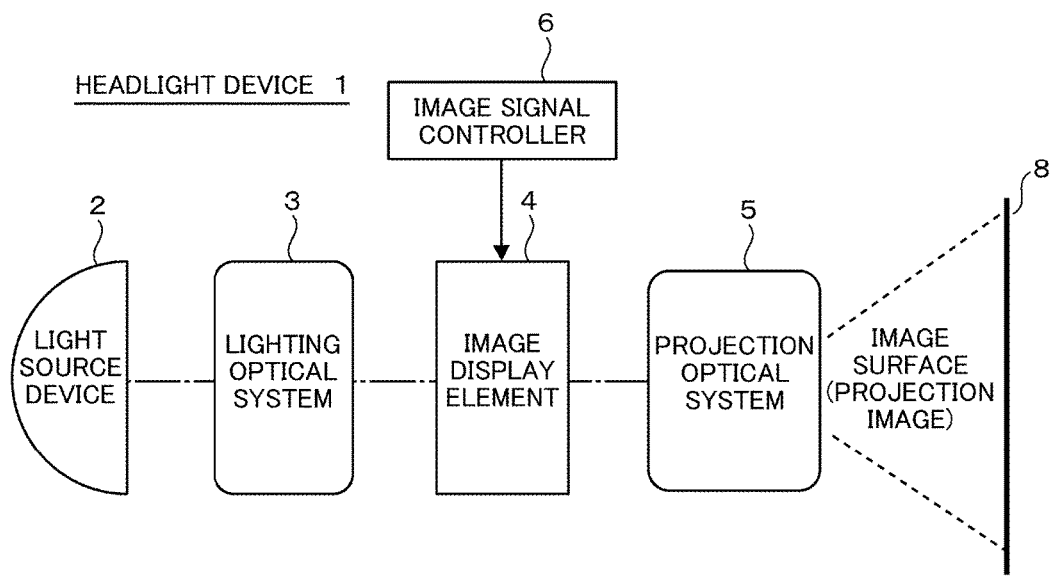
FIG. 1 is a block diagram illustrating an overall configuration of a headlight device (Embodiment 1).

FIG. 1 is a block diagram illustrating an overall configuration of the headlight device. The headlight device 1 includes a light source device 2, a lighting optical system 3, an image display element 4, a projection optical system 5, and an image signal controller 6.

The light source device 2 includes a discharge lamp or an LED lamp, and a reflector. Alternatively, a laser light source may be used. The lighting optical system 3 condenses and uniformizes light emitted from the light source device 2 using a lens, and allows the light to enter the image display element 4. For example, the image display element 4 is a liquid crystal panel. The image display element 4 modulates incident light using an image signal, and forms a projected optical image. The Projection optical system 5 magnifies the optical image and projects the magnified optical image onto an image surface 8. The present embodiment is applied to a case in which the image surface 8 is a road surface. The image signal controller 6 supplies the image signal for forming the optical image to the image display element 4.

When a color image is projected as a projection image, a color separation optical system of R, G, and B may be provided in the lighting optical system 3, a liquid crystal panel of R, G, and B may be configured as the image display element 4, and a color synthesis optical system may be provided in the projection optical system 5.

Figure 2:
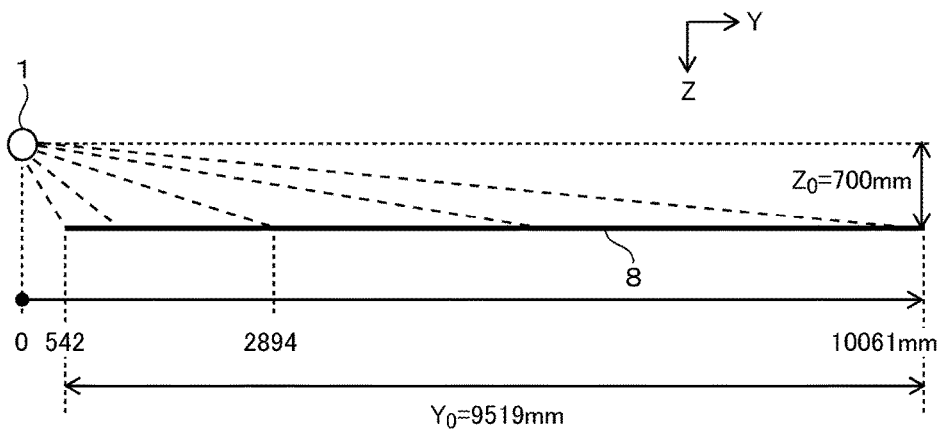
FIG. 2 is a diagram illustrating a positional relation between the headlight device and an image surface (road surface).

FIG. 2 is a diagram illustrating a positional relation between the headlight device 1 and the image surface 8 (road surface). Image light emitted from the projection optical system 5 of the headlight device 1 is projected onto the image surface corresponding to the road surface. Hereinafter, the image surface 8 (road surface) is set to an XY surface, a width direction of a road is set to an X axis, a driving direction is set to a Y axis, and a direction perpendicular thereto is set to a Z axis.

For example, a position and a size of the projection image implemented in the present embodiment are as below. For example, a length of a perpendicular line (Z axis direction) drawn from an emission position of the headlight device 1 (a center of an optical axis of a free-form surface mirror 4 inside the projection optical system 5 described below) to the image surface 8 (road surface), that is, a projection distance $Z_0$ is set to 700 mm. This length is a value determined by a height of the headlight device 1 from the road surface. In addition, for example, a size Y of the projection image in a long-side direction (Y axis direction) is set to a large screen size of 9,519 mm (10,061–542) in order to allow the image projected onto the road to be readily visually recognized by a driver or a pedestrian. As a result, a projection ratio defined as a size ratio of the projection distance to the projection image is an extremely small value of 700/9,519=0.07. Further, a configuration for widening an angle (in particular, a combination of a free-form surface lens and a free-form surface mirror) is employed in the projection optical system 5 in order to implement such a small projection ratio. In this way, a projection ratio <0.1, which has been difficult to be implemented in the past, is achieved.

Figure 3:
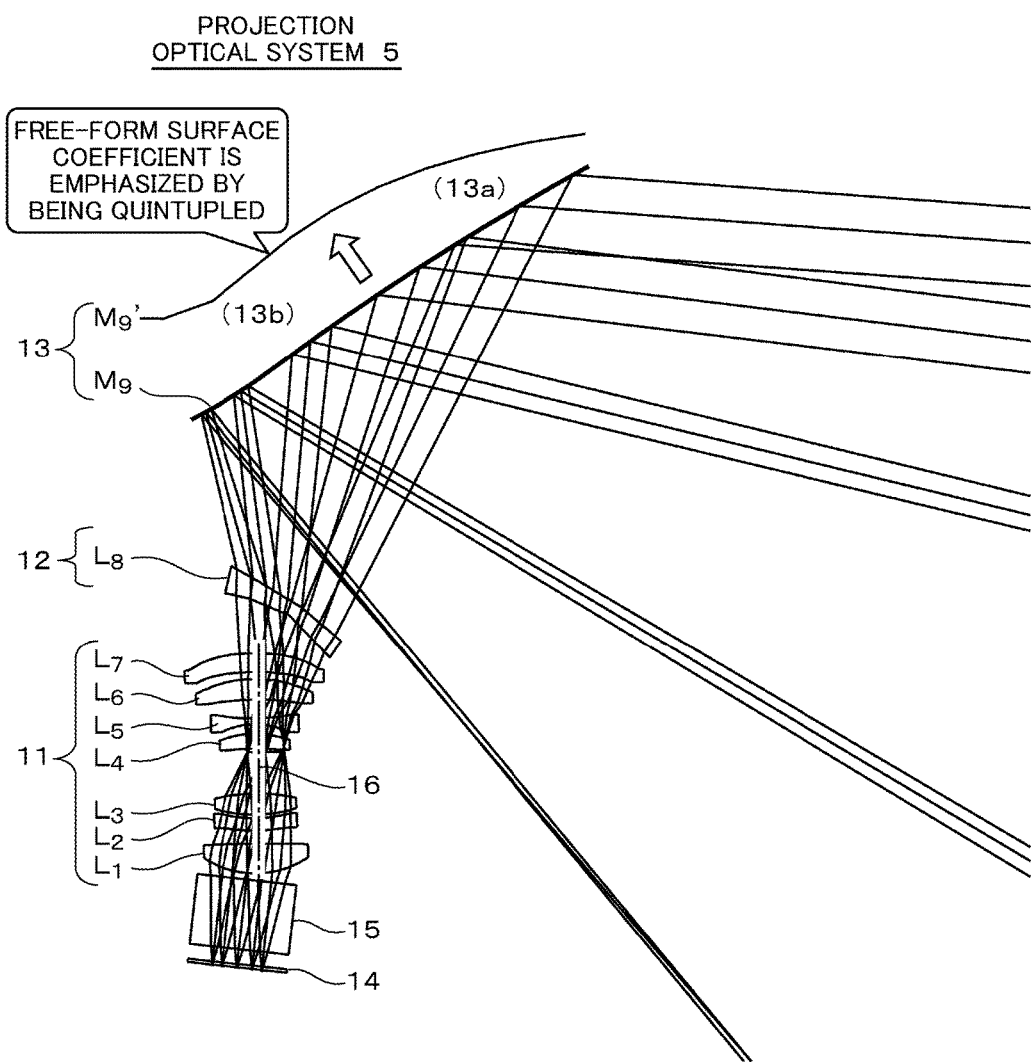
FIG. 3 is a diagram illustrating a beam direction and a configuration of a projection optical system.

FIG. 3 is a diagram illustrating a beam direction and a configuration of the projection optical system 5 of FIG. 1.

Image light emitted from the image display element 4 passes through a filter including cover glass 14 and a total internal reflection (TIR) prism 15, receives a refractive action by a coaxial lens system 11 and a free-form surface lens 12, receives a reflex action by a free-form surface mirror 13, and then is projected onto the road corresponding to the image surface 8.

The coaxial lens system 11 corresponds to a retrofocus type including a lens group (lens $L_1$ to lens $L_3$) having positive refractive power and a lens group (lens $L_4$ to lens $L_7$) having negative refractive power. The respective lenses $L_1$ to $L_7$ have a common optical axis 16.

Shapes of the respective lenses are configured from the image display element 4 side such that the lens $L_1$ is made of Glass, has positive refractive power, and has a small radius of curvature facing the image display element 4 side (hereinafter an incident side), the meniscus-shaped aspherical lens $L_2$ is made of plastic and has a convex surface facing the incident side, and the biconvex-shaped lens $L_3$ is made of plastic and has positive refractive power. Further, the meniscus-shaped lens $L_4$ is made of glass, has positive refractive power, and has a concave surface facing the incident side, the biconcave-shaped lens $L_5$ is made of glass and has negative refractive power, the meniscus-shaped lens $L_6$ is made of glass, has positive refractive power, and has a concave surface facing the incident side, and the meniscus-shaped lens $L_7$ corresponds to an odd-order aspherical lens made of plastic and has a concave surface facing the incident side.

The free-form surface lens 12 includes a meniscus lens-shaped free-form surface lens $L_8$, which is made of plastic and has a concave surface facing the incident side.

The free-form surface mirror 13 includes a free-form surface mirror $M_9$ having a free-form surface shape in which an upper part 13a of the mirror has a concave surface shape and a lower part 13b of the mirror has a convex surface shape. A mirror $M_9'$ is illustrated by quintupling and emphasizing a free-form surface coefficient in order to facilitate the understanding of a characteristic of a curved surface shape of the mirror $M_9$. Light emitted from the upper part 13a of the mirror forms a projection image at a remote position (Y=10,061 mm side) on the image surface 8 of FIG. 2, and light emitted from the lower part 13b of the mirror forms a projection image at a close position (Y=542 mm side) on the image surface 8.

FIG. 4 is a diagram illustrating an example of lens data of the projection optical system. Data of from cover glass to the free-form surface mirror $M_9$ is illustrated. A plus sign is assigned to a radius of curvature when a central position of the radius of curvature is in a direction of movement. An inter-surface distance represents a distance on an optical axis from an apex position of each surface to an apex position of a subsequent surface.

Eccentricity refers to a value in the Y axis direction, and slant refers to rotation around the X axis within a YZ plane. Eccentricity/slant act in order of eccentricity and slant on a corresponding surface. In "general eccentricity", a subsequent surface is disposed at a position of an inter-surface distance in a new coordinate system on which eccentricity/slant act. Meanwhile, in "decenter & return (DAR)", eccentricity and slant act only on the surface, and do not affect a subsequent surface. PMMA as a Glass material name refers to acryl of plastic.

FIG. 5 is a diagram illustrating curved surface shape data of the free-form surface lens $L_8$ and the free-form surface mirror $M_9$. A free-form surface shape Z is defined as Equation 1, which is a polynomial of X and Y, and a numerical value of FIG. 5 is used for each coefficient C of the polynomial.

$$Z = \frac{c \cdot (x^2 + y^2)}{1 + \sqrt{1 - (1 + K)c^2 \cdot (x^2 + y^2)}} + \sum \sum (Cj(m, n) \times x^m \times y^n)$$

$$j = [(m+n)^2 + m + 3n]/2 + 1$$

[Equation 1]

Herein, shapes of the lens $L_8$ and the mirror $M_9$ correspond to a rotationally asymmetrical free-form surface shape with respect to each optical axis (Z axis), and are defined by a component of a cone term and a component of a term of the polynomial of X and Y. For example, when X corresponds to the second order (m=2), and Y corresponds to the third order (n=3), j={(2+3)²+2+3×3}/2=19, and a coefficient of $C_{19}$ corresponds thereto. In addition, a position of each optical axis of a free-form surface is determined according to the amount of eccentricity/slant in the lens data of FIG. 4.

FIGS. 6A and 6B are diagrams illustrating curved surface shape data of the aspherical lens $L_2$ and the aspherical lens $L_7$. FIG. 6A corresponds to data of the lens $L_2$, and FIG. 6B corresponds to data of the lens $L_7$. An aspherical shape Z is defined as Equation 2, which is a polynomial of a height h from an optical axis, and a numerical value of FIGS. 6A and 6B is used for each coefficient of the polynomial.

$$Z = \frac{c \cdot h^2}{1 + \sqrt{1 \cdot (1+K)c^2 \cdot h^2}} + A \times h^4 + B \times h^6 + C \times h^8 +$$
$$D \times h^{10} + E \times h^{12} + F \times h^{14} + G \times h^{16} + H \times h^{18} + J \times h^{20}$$
[Equation 2]

Herein, shapes of the lenses $L_2$ and $L_7$ correspond to a rotationally symmetrical aspherical shape with respect to each optical axis (Z axis), and are defined using a component of a cone term and even-order components from the fourth order to the twentieth order of the height h from the optical axis illustrated in FIG. 6A.

Further, the aspherical lens $L_7$ is represented by an odd-order polynomial, and corresponds to a shape obtained by adding an odd-order component of FIG. 6B to the aspherical shape of FIG. 6A. In this case, the height h is a positive value, and a rotationally symmetrical shape is obtained.

Hereinafter, a description will be given of distortion performance, a distribution of quantity of light, and a spot size as optical performances of the projection image according to the present embodiment.

FIG. 7 is a diagram illustrating distortion of the projection image. In the projection image viewed from the headlight device, an X axis direction corresponds to a horizontal direction, and the Y axis direction corresponds to a vertical direction. An image display range of the image display element 4 is indicated by a broken line, and an image display range on the image surface 8 is indicated by a solid line. In addition, in order to indicate distortion of the image, the image display range of the image display element 4 is divided into nine parts in the horizontal direction (X axis) and into 16 parts in the vertical direction (Y axis), and a position, at which a beam emitted from each intersection point of dividing lines is projected onto the image surface, is indicated. Herein, a position, at which a beam emitted from a central position of the image display range of the image display element 4 is projected onto the image surface 8, is indicated to be the same position (O mark).

An aspect ratio is 1.6 when a rectangle, in which an X size of the image display range is 6.1 mm and a Y size of the image display range is 9.8 mm, is presumed as a standard image display element 4.

The projection image corresponding thereto has a trapezoid shape widening in a depth direction. An X size on a side close to the headlight device (lower base of the figure) is 1,502 mm, and an X size on a side far from the headlight device (upper base of the figure) is 5,317 mm. A difference therebetween is 5,317/1,502=3.5 times. In addition, as illustrated in FIG. 2, a Y size ($Y_0$) in the depth direction is 9,519 mm. An aspect ratio at this time is $Y_0/X_0$=9,519/3,410=2.8 when obtained from 3,410 mm corresponding to an average value ($X_0$) of the X size.

Next, a shape of the projection image will be described using a viewing angle calculated by a distance from eyes of the driver. When a distance from the eyes of the driver to the headlight device is presumed to be 2 m and added to a distance of 542 to 10,061 mm in the Y axis direction from the headlight device to the projection image illustrated in FIG. 2, a distance from the eyes of the driver to the projection image is in a range of 2,542 to 12,061 mm. Therefore, a viewing angle viewed from a position of the eyes of the driver is $\tan^{-1}(1,502/2,542)$=31 degrees at an upper base of the projection image and $\tan^{-1}(5,317/12,061)$=24 degrees at an upper base of the projection image. In other words, even though an X size of the projection image is different between the lower base and the upper base, one of which is 3.5 times the other one, the difference is reduced to 31/24=1.3 times at the viewing angle from the eyes of the driver, and the image may be regarded as an image having distortion that easily seems small.

In addition, when an aspect ratio is represented as an aspect ratio of a cross-shaped image pattern (the O mark position corresponds to a center), $Y_0/X_0'$=9,519/2,557=3.7 is obtained using $X_0'$=2,557 mm passing through the O mark position as an X size, which is large in width and vertically long. In this way, an image, an aspect ratio of which is drastically enlarged to 3.7, may be projected using the image display element 4 whose aspect ratio is 1.6. As described above, an image readily visually recognized by the driver may be displayed when an image is projected by enlarging an aspect ratio.

Figure 8:
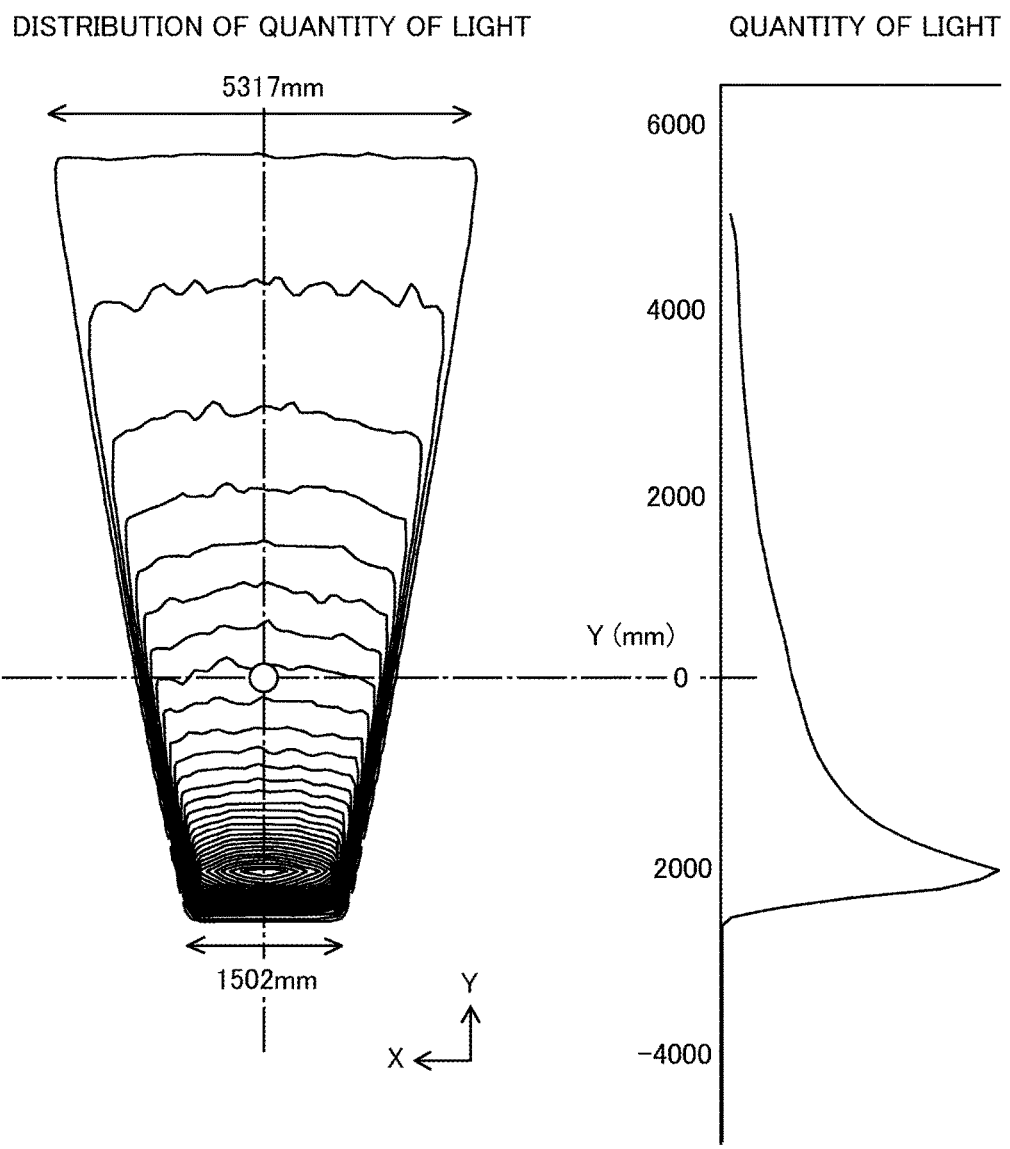
FIG. 8 is a diagram illustrating a distribution of quantity of light of the projection image.

FIG. 8 is a diagram illustrating a distribution of quantity of light of the projection image. Referring to the distribution of quantity of light, a quantity of light is large at a side close to the headlight device (lower base), and a quantity of light becomes smaller at a side far from the headlight device (upper base), which corresponds to a change to a trapezoid (a change in X size) of the projection image described in FIG. 7. With regard to this change, a difference in quantity of light is reduced when the viewing angle of the driver described in FIG. 7 is corrected.

Figure 9:
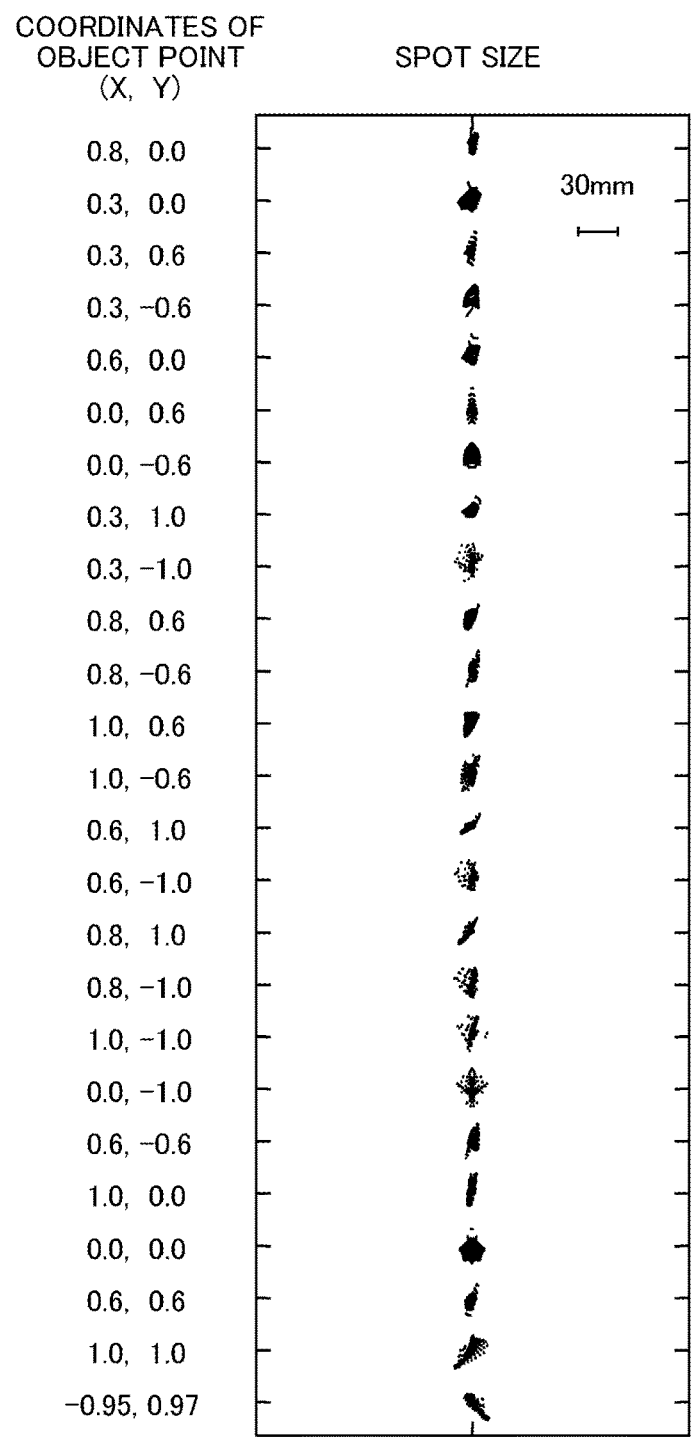
FIG. 9 is a diagram illustrating a spot size of the projection image.

FIG. 9 is a diagram illustrating a spot size of the projection image. 25 object points are disposed on a right-half surface of the image display element 4, and spot sizes on the image surface corresponding thereto are illustrated. Since this optical system is left-right symmetric (symmetric with respect to the Y axis), the above description corresponds to a case in which 45 object points are disposed in the whole image display element 4. Coordinates of an object point standardize a size of the image display range of the image display element 4 in a range of ±1 of a maximum value. A spot size on the image surface is less than or equal to 30 mm at each position, and the spot size will be compared with a size of the whole projection image. When the projection image size is defined by a size $Y_0$=9,519 mm in the Y direction and an average size $X_0$=3,410 mm in the X direction of a trapezoid region illustrated in FIG. 7, the projection image size corresponds to a size of 398 inches. When a spot size is less than or equal to 30 mm, the spot size corresponds to 3% or less of the size of 398 inches. Thus, it is understood that the spot size is an excellent spot size.

In this way, in projection performance of the headlight device of Embodiment 1, the size of the projection image (length in the Y axis direction) is 9,519 mm with respect to the projection distance (Z axis direction) of 700 mm, and a drastically widened angle, at which the projection ratio is 0.07 and which has not been achieved, may be implemented. In addition, a drastically enlarged image, an aspect ratio of which viewed from the driver is 3.7, may be projected, and an image readily viewed by the driver may be displayed.

Embodiment 2

In Embodiment 2, a description will be given of a vehicle device equipped with the headlight device described in Embodiment 1. In this instance, an operation of changing an aspect ratio of a projection image is performed. However, when the projection image is displayed on a road, an aspect ratio of the projection image changes according to a person that views the projection image and a direction in which the projection image is viewed. In this regard, in Embodiment 2, [an aspect ratio viewed from a driver] is defined as [a vertical size of the projection image viewed from the driver]/[a horizontal size of the projection image viewed from the driver].

Figure 10:
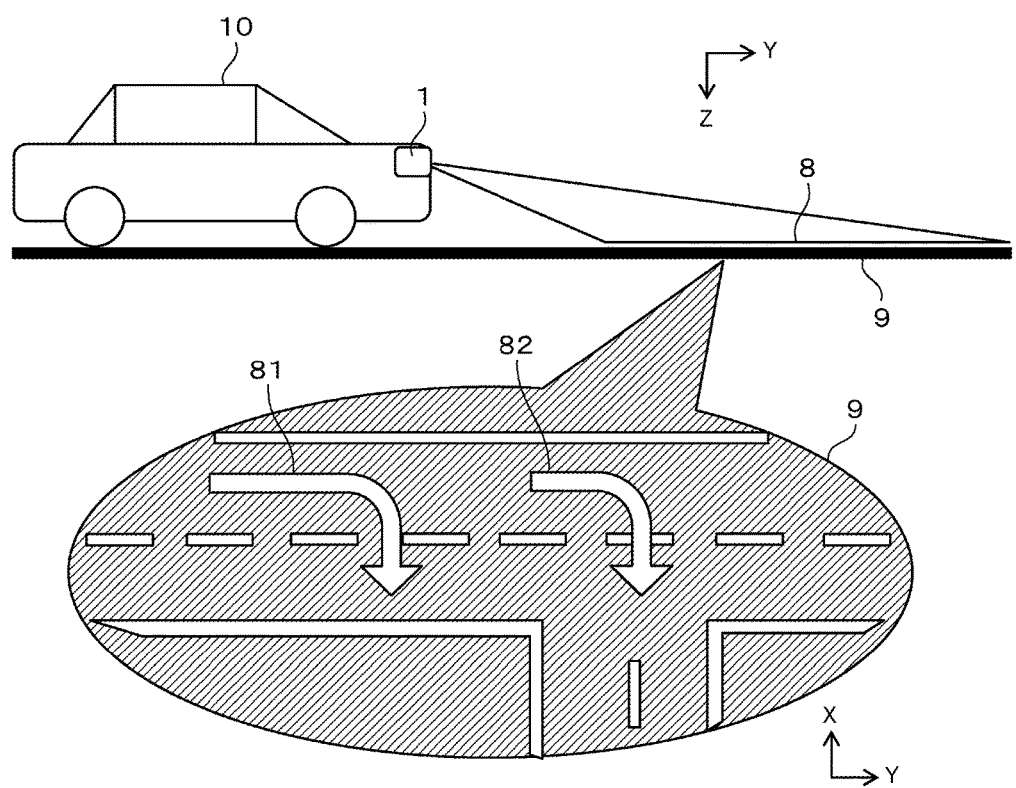
FIG. 10 is a diagram illustrating a vehicle device equipped with the headlight device (Embodiment 2).

FIG. 10 is a diagram illustrating the vehicle device according to Embodiment 2. A vehicle device (vehicle) 10 is equipped with a headlight device 1 to project an image onto a road 9 serving as an image surface 8. The vehicle 10 includes a running velocity detector (not illustrated), and an image signal controller 6 of the headlight device 1 controls the projected image depending on a running velocity of the vehicle. Hereinafter, a description will be given of a specific example of image control.

For example, when the driver performs an operation of indicating a right turn, an image 81 of a right turn arrow indicating the right turn is displayed on the road 9 from the headlight device 1. This display image 81 is set to an arrow having a vertically long aspect ratio which is long in a driving direction (Y axis direction) (for example, the aspect ratio>2) so as to be readily viewed by the driver for the same reason as a reason for drawing a vertically long speed limit sign, for example, "60" on the road.

In this state, when the vehicle 10 approaches an intersection, etc. at which the vehicle turns right, the driver slows down a speed of the vehicle. The image signal controller 6 changes the arrow to an arrow having a small aspect ratio (for example, aspect ratio=1) as a display image 82 in response to the change of the speed of the vehicle in order for another vehicle at a right turn lane or a pedestrian walking on a crosswalk to readily visually view the display image when the vehicle turns right at the intersection. As a result, it is effective in preventing a traffic accident by informing the presence of a vehicle turning right to a vehicle or a person around the vehicle.

Herein, a case in which the vehicle turns right has been described. However, the above description is effective in a case in which the vehicle turns left. In addition, it is effective when a color of the display image is changed to a color having high visibility such as red, or the display image is flickered simultaneously with changing the aspect ratio of the display image.

Figure 11:
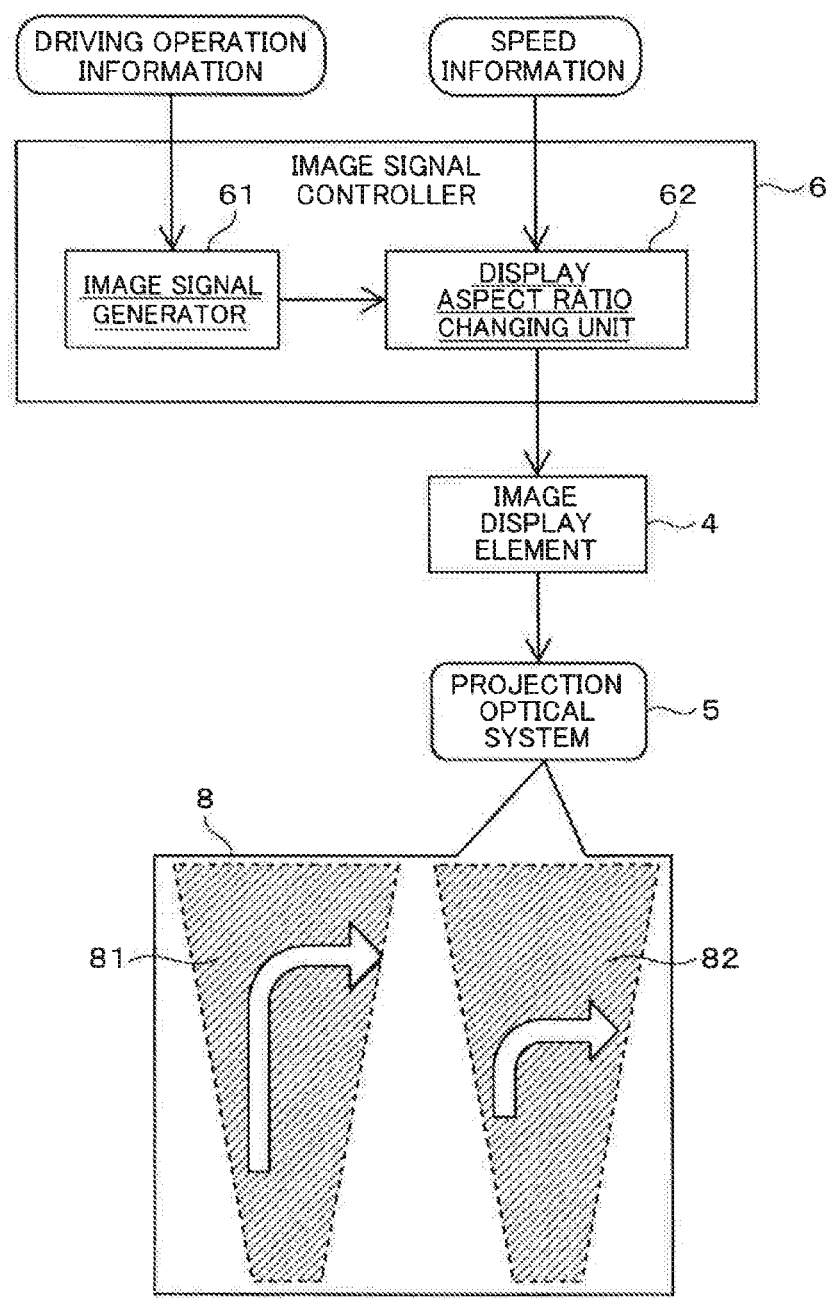
FIG. 11 is a diagram for description of an operation of an image signal controller.

FIG. 11 is a diagram for description of an operation of the image signal controller 6 of the headlight device 1. The image signal controller 6 includes an image signal generator 61 and a display aspect ratio changing unit 62. The image signal generator 61 receives operation information of the driver, generates a predetermined image signal, and supplies the generated image signal to an image display element 4. For example, upon receiving driving operation information related to a right turn, an image signal of a right turn arrow is supplied to the image display element 4, and the image 81 of the right turn arrow is displayed on the road from the projection optical system 5.

Meanwhile, the display aspect ratio changing unit 62 acquires information about a running velocity from the running velocity detector of the vehicle device 10. The display aspect ratio changing unit 62 compares a current running velocity with a predetermined threshold value, determines a display aspect ratio based on whether the current running velocity is greater than the threshold value, and changes the signal supplied to the image display element 4. A method of performing image processing of enlarging/reducing a vertical size of an image pattern, a method of selecting a pattern by preparing images whose image patterns have different aspect ratios, etc. is used to change an aspect ratio of an image. Alternatively, a method of adopting only a portion of a display range (irradiation range) (for example, an upper end portion and a lower end portion are darkened) without changing an image pattern maybe used depending on the image type. In every method, it is possible to change an aspect ratio of a display image in appearance.

As described above, the present embodiment may change a display range of an image on a road depending on running states of a vehicle, and is defective in contributing to preventing a traffic accident.

REFERENCE SIGNS LIST

1 . . . headlight device
2 . . . light source device
3 . . . lighting optical system
4 . . . image display element
5 . . . projection optical system
6 . . . image signal controller
7 . . . image surface
9 . . . road
10 . . . vehicle device
11 . . . coaxial lens system
12 . . . free-form surface lens
13 . . . free-form surface mirror
61 . . . image signal generator
62 . . . display aspect ratio changing unit
81, 82 . . . projection image

The invention claimed is:

1. A headlight device that projects an image onto a road surface, the headlight device comprising:
  a light source device;
  a lighting optical system that condenses light emitted from the light source device;
  an image display element that forms an optical image by receiving the light condensed by the lighting optical system;
  a projection optical system that includes a coaxial lens system having a refractive action, a free-form surface lens, and a free-form surface mirror from a side of the image display element, wherein the projection optical system:
  enlarges the optical image formed by the image display element to form an enlarged image, and
  projects the enlarged optical image onto the road surface to form a projection image,
  wherein a vertical size of the projection image on the road surface viewed from the headlight device is set to $Y_0$, and a horizontal size of the projection image is set to $X_0$, and
  an aspect ratio $Y_0/X_0$ of the projection image on the road surface is larger than an aspect ratio (Y size/X size) of an image display range of the image display element.

2. The headlight device according to claim 1, wherein an inequality of
  a projection ratio=$Z_0/Y_0<0.1$
  is satisfied when a length of a perpendicular line drawn from an emission position of the projection optical system to the road surface onto which the image is projected is set to $Z_0$, and a length of a long side of a projection image on the road surface is set to $Y_0$.

3. The headlight device according to claim 1, wherein an inequality of
  an aspect ratio=$Y_0/X_0>2$.

4. The headlight device according to claim 1, wherein the optical image is a predetermined optical image that is generated according to operation information of a driver, and an aspect ratio of the projection image is determined according to running velocity information of a vehicle device, and changes the optical image supplied to the image display element.

5. The headlight device according to claim 4, wherein, an aspect ratio of the projection image viewed from the is set to a vertical size of the projection image and a horizontal size of the projection image as viewed from the driver, wherein, when a running velocity of the vehicle device is slower than a predetermined velocity, the aspect ratio of the projection image viewed from the driver is adjusted down to a smaller value.

6. The headlight device according to claim 5, wherein the aspect ratio of the projection image viewed from the driver is adjusted down to the smaller value corresponds to a case in which an optical image is generated indicating a right turn sign or a left turn sign.

* * * * *